(12) United States Patent
Dupoiron et al.

(10) Patent No.: US 6,253,793 B1
(45) Date of Patent: Jul. 3, 2001

(54) FLEXIBLE PIPE WITH I-SHAPED WIRE WINDING

(75) Inventors: François Dupoiron, Barentin; Philippe François Espinasse, Bihorel; Patrice Jung, La Mailleraye-sur-Seine, all of (FR)

(73) Assignee: Corlexip (FR)

( * ) Notice: Subject to any disclaimer, the term of this patent is extended or adjusted under 35 U.S.C. 154(b) by 0 days.

(21) Appl. No.: 09/719,618

(22) PCT Filed: Jul. 30, 1999

(86) PCT No.: PCT/FR99/01892

§ 371 Date: Dec. 14, 2000

§ 102(e) Date: Dec. 14, 2000

(87) PCT Pub. No.: WO00/09899

PCT Pub. Date: Feb. 24, 2000

(30) Foreign Application Priority Data

Aug. 10, 1998 (FR) .................................... 98 10254
Dec. 2, 1998 (FR) .................................... 98 15221

(51) Int. Cl.[7] ..................................................... F16L 11/16
(52) U.S. Cl. ............................ 138/135; 138/133; 138/138
(58) Field of Search .................................. 138/135, 133, 138/134, 129, 138, 147, 130

(56) References Cited

U.S. PATENT DOCUMENTS 3,858,616 * 1/1975 Thiery et al. ........................ 138/133
5,275,209 * 1/1994 Sugier et al. ......................... 138/135
5,730,188 * 3/1998 Kalman et al. ....................... 138/135
B1 6,192,941 * 2/2001 Mallen-Herrero et al. .......... 138/135

FOREIGN PATENT DOCUMENTS

| 0307613 | 3/1989 | (EP) . |
| 2210267 | 7/1974 | (FR) . |
| 2229913 | 12/1974 | (FR) . |
| 2645795 | 5/1991 | (FR) . |
| 2727738 | 6/1996 | (FR) . |
| 2744511 | 8/1997 | (FR) . |
| 9825063 | 6/1998 | (WO) . |

OTHER PUBLICATIONS

Specification for Unbonded Flexible Pipe, API Specification 17J, First Edition, Dec. 1996 Effective Date: Mar. 1, 1997, American Petroleum Institute.

Recommended Practice for Flexible Pipe, API Recommended Practice 17B (RP 17B), First Edition, Jun. 1, 1988, American Petroleum Institute.

* cited by examiner

Primary Examiner—Patrick Brinson
(74) Attorney, Agent, or Firm—Ostrolenk, Faber, Gerb & Soffen, LLP

(57) ABSTRACT

A flexible tubular pipe having an internal sheath and a pressure vault around the sheath with a helically would short pitch metal wire. The metal wire has an I-shaped cross-section with a narrowed central web and greater thickness internal and external flanges. Recesses in at least one set of the flanges enable fastening elements to be installed for holding to adjacent wire windings. The ratios of widths of the flanges, height and width of the wire, moments of inertia in the width wise and radial direction are disclosed.

17 Claims, 6 Drawing Sheets

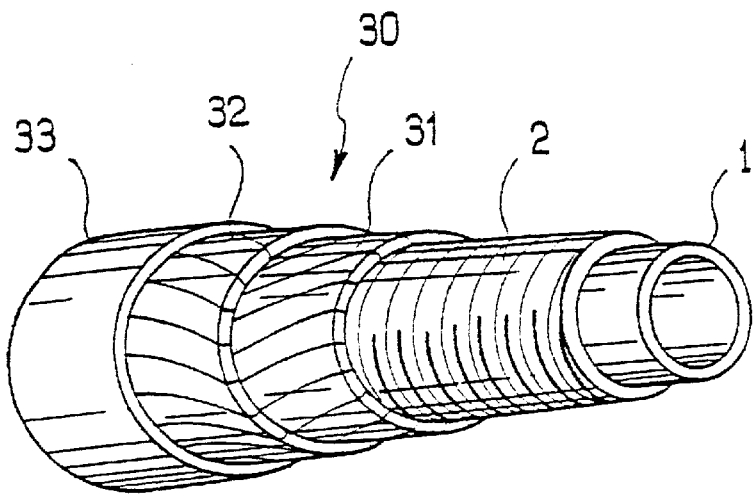
FIG_1
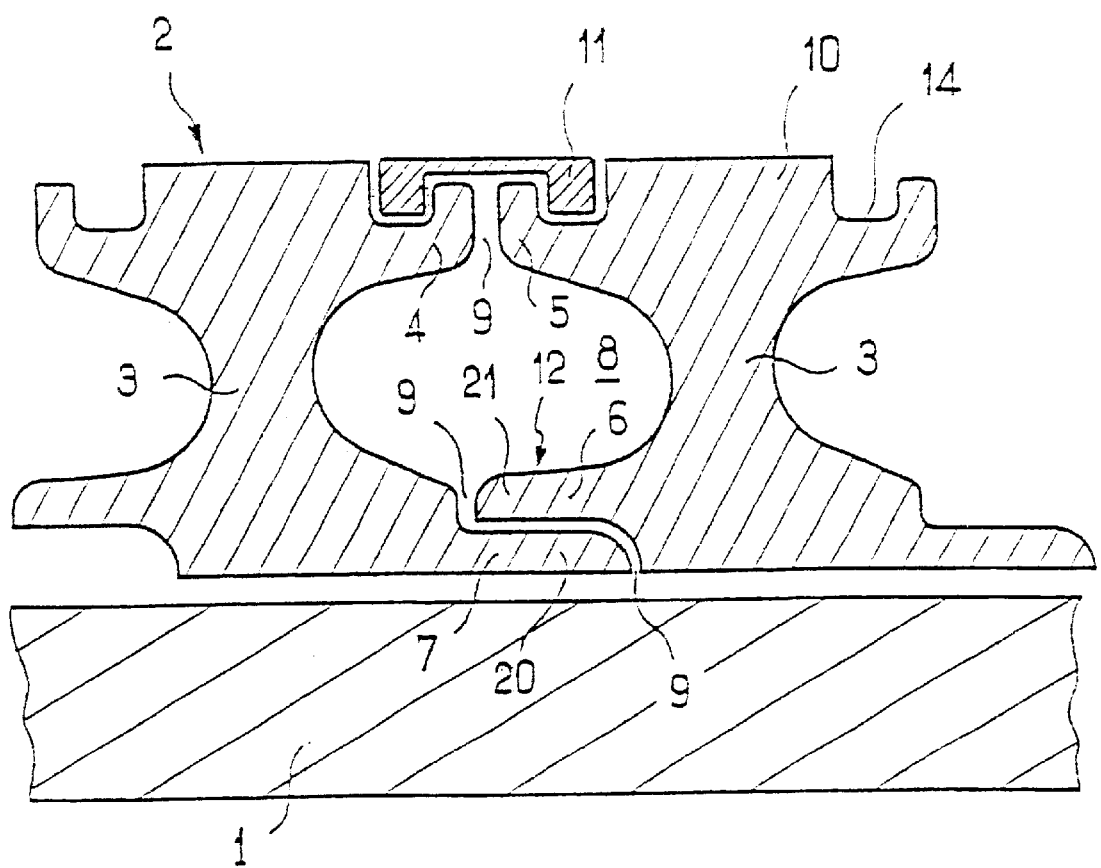
FIG_2

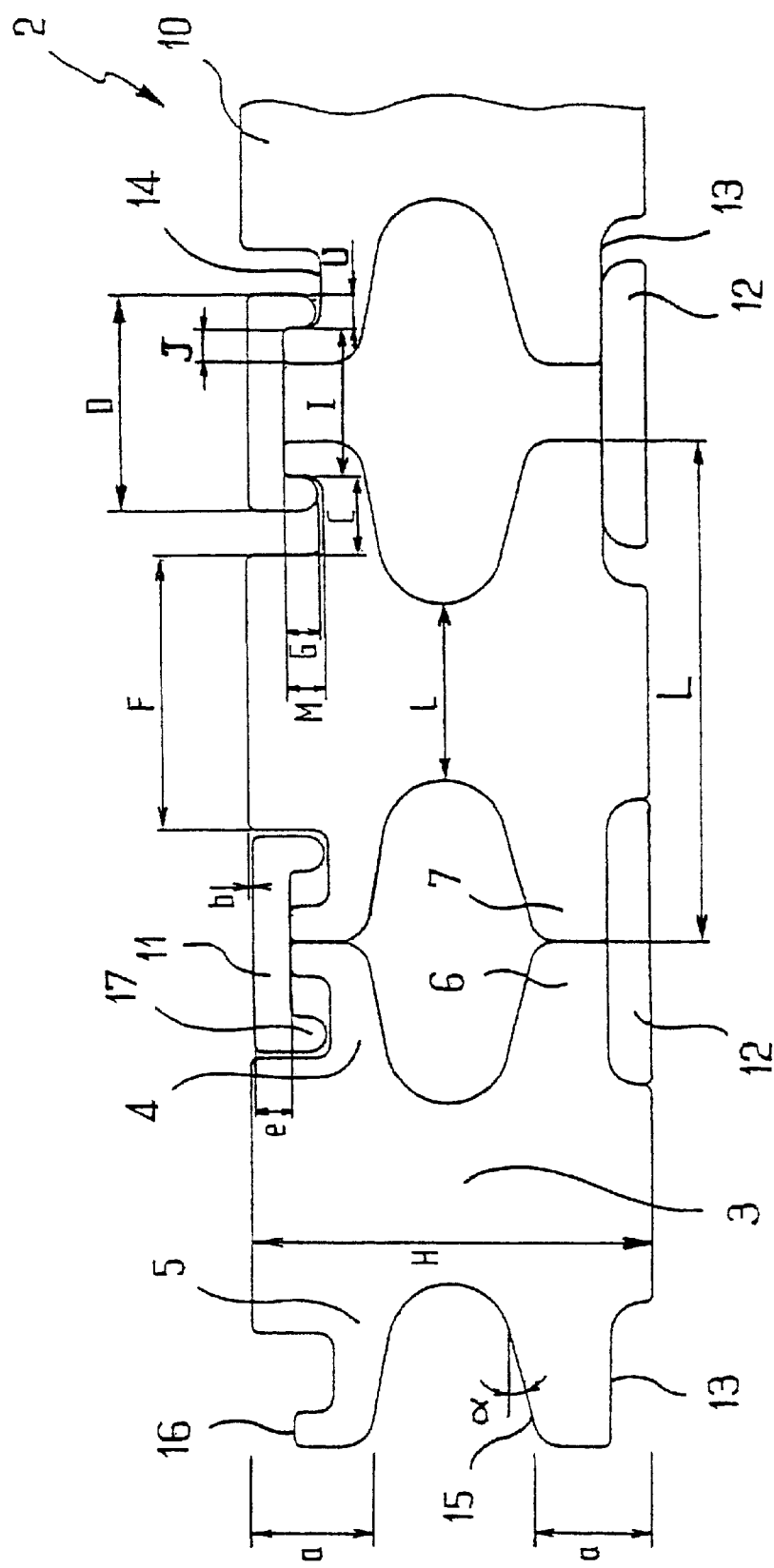
FIG_3

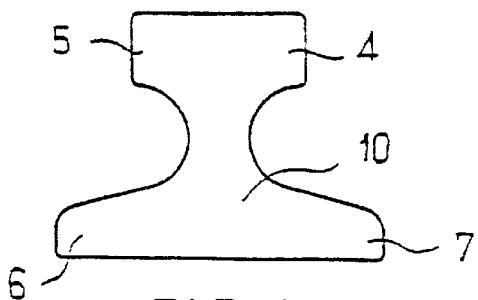
FIG_6
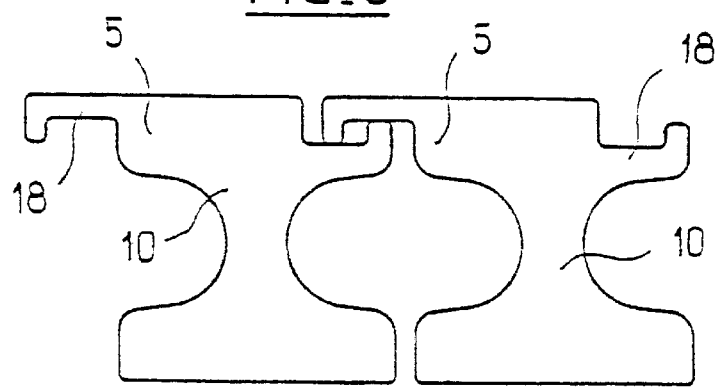
FIG_7
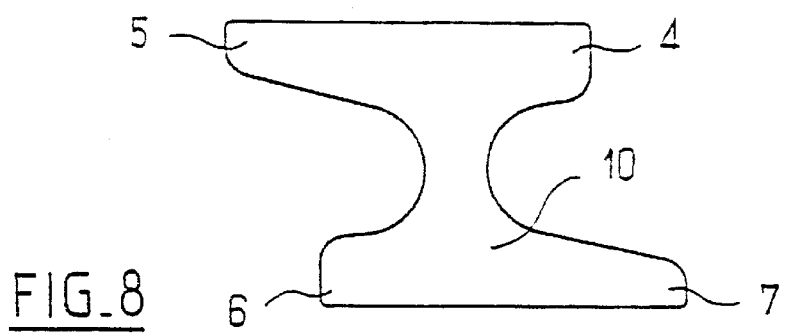
FIG_8
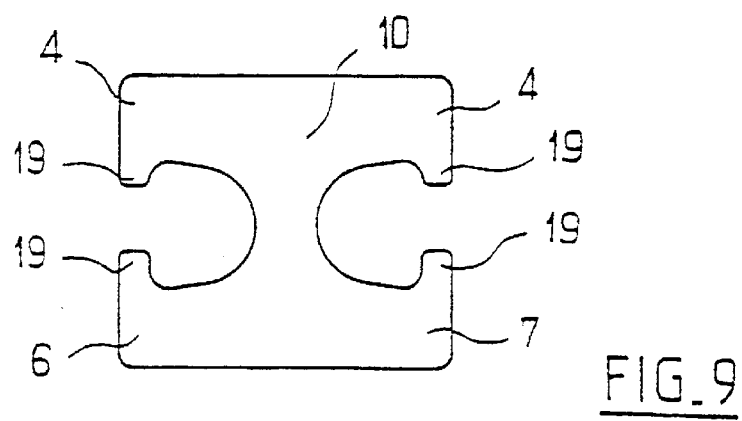
FIG_9

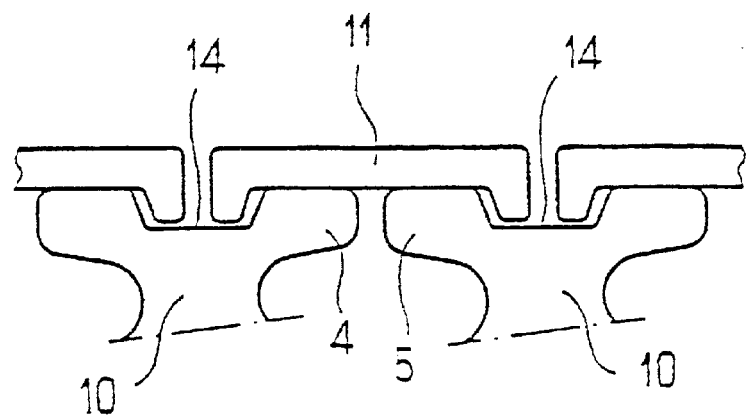
FIG_10
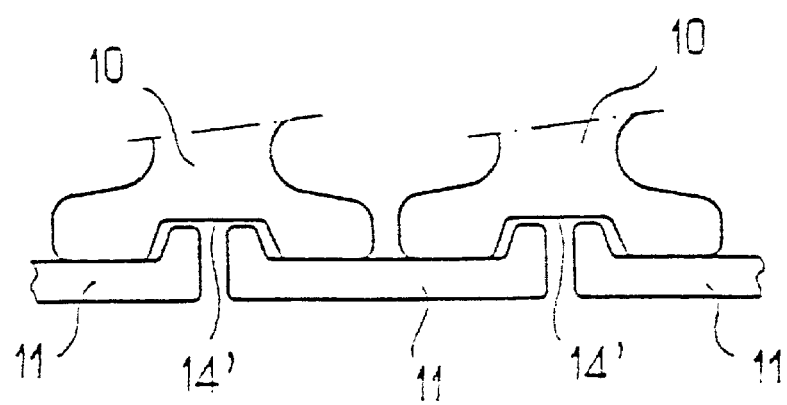
FIG_11
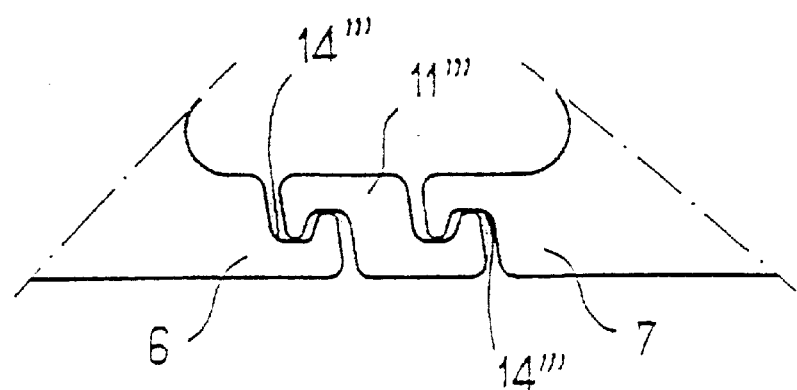
FIG_12

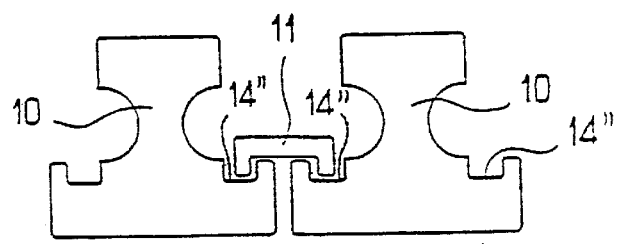
FIG_13
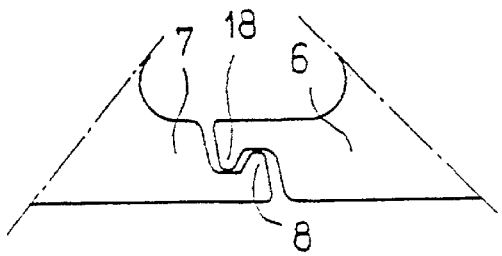
FIG_14
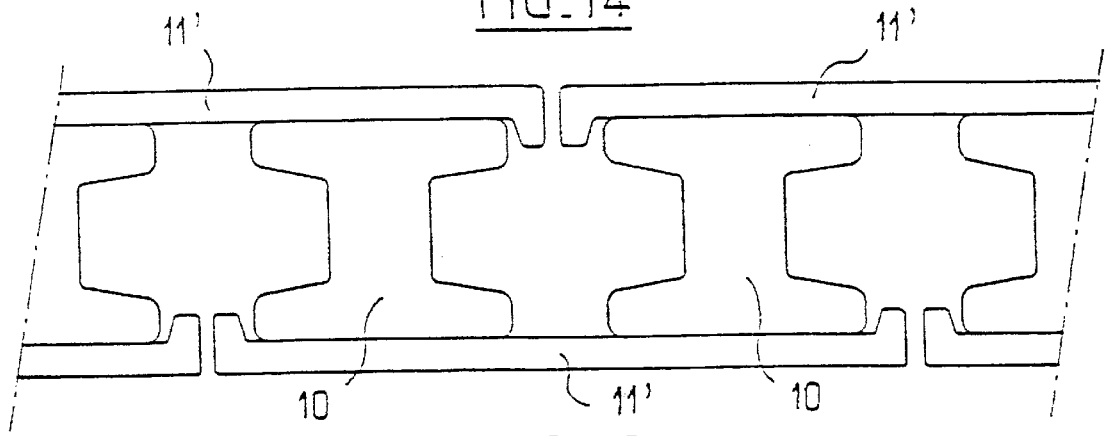
FIG_15
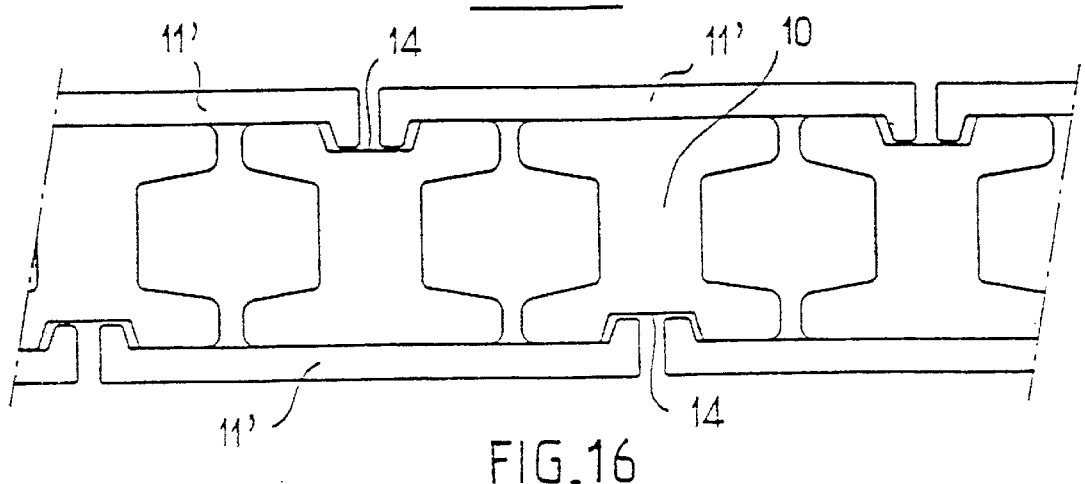
FIG_16

FLEXIBLE PIPE WITH I-SHAPED WIRE WINDING

BACKGROUND OF THE INVENTION

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It relates especially first, to the flow lines, that is to say flexible pipes unwound from a barge in order to be laid generally on the bottom of the sea and connected to the subsea installations, such pipes working mainly in static flexible pipes which are unwound from a surface installations and most of which do not lie below the seabed, such pipes working essentially in dynamic mode.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the standards API 17 B and API 17 J drawn up by the American Petroleum Institute under the tile "Recommended Practice for Flexible Pipe". Reference may also be made to documents FR 2 654 795 A, WO 938/25 063 A, FR 2 727 738 A and FR 2 744 511 A.

A flexible pipe generally comprises, from the inside outward:

- an internal sealing sheath made of a plastic, generally a polymer, able to resist to a greater or lesser extent the chemical action of the fluid to be transported;
- a pressure vault resistant mainly to the pressure developed by the fluid in the sealing sheath and consisting of the winding of one or more interlocked profiled metal wires (which may or may not be self-interlockable) wound in a helix with a short pitch (i.e. with a wind angle close to 90°) around the internal sheath;
- at least one ply (and generally at least two crossed plies) of tensile armor layers whose lay angle measured along the longitudinal axis of the pipe is less than 55°; and
- an external protective sealing sheath made of a polymer.

Such a structure is that of a pipe with a so-called smooth bore. In a pipe with a so-called rough bore, a carcass consisting of an interlocked metal strip, which serves to prevent the pipe being crushed under external pressure, is also provided inside the internal sealing sheath. However, the pressure vault also contributes to the crushing strength.

Attempts are made to reduce the weight of flexible pipes, particularly for applications at great depth, where, in order to rests being crushed, it is necessary to considerably increase the moment of inertia of the profiled wire constituting the pressure vault. The weight of the flexible pipe also plays an important role when laying it; this is because its weight must be limited so as to allow it no be laid by existing means (for example 600 tonnes for a conventional system).

The pressure vault consists of a profiled wire, usually of the Z or T type, or derivatives (teta and zeta) thereof, which is wound with a short pitch. The profiled wire is generally such that the ratio of its height to its width is less than 1, so as to prevent warping in winding the vault. In addition, it is known to dimension the pressure vault so that it helps to delay the onset of ovalization of the carcass under the increase in internal pressure (this onset resulting in the ruin of the carcass), but promotes the extension of the preferred cardioidal deformation mode: the delay in ovalization is all the greater the higher the moment of inertia $I_{xx}$, of the profiled wire constituting the vault.

For applications at great depth, it is therefore desired to increase the moment of inertia of the profiled wire usually employed, in order to resist the crushing pressure; for example, it would be desirable to use a teta wire 16 mm in height. However, this would result in drawbacks, such as the increase in the weight of the pipe which may exceed the limit of the laying system, or even exceed the limits of resistance of the pipe itself being able to support its own weight when laying it; and a more complex implementation of this type of profiled wire; all these drawbacks increase the manufacturing cost of such a pipe.

The oil industry is therefore seeking an interlockable profiled wire having a high moment of inertia $I_{xx}$ for a low weight.

It has already been proposed, in document U.S. Pat. No. 4,549,581 A, to use interlockable U-shaped profiled wires, but the improvement made to the moment of inertia/weight ratio has not been significant. Moreover, it appears not to be easy to envision lightening the known S-, Z- or T-shaped sections by providing hollows, for manufacturing reasons.

SUMMARY OF THE INVENTION

The objective of the invention is therefore to propose a novel type of interlockable section allowing the moment of inertia/weight ratio to be very favorably increased.

The objective of the invention is achieved by providing a flexible tubular pipe comprising at least, from the inside outward, an internal sealing sheath, a cylindrical pressure vault consisting of the winding of an interlocked profiled metal wire wound in a helix with a short pitch, at least one ply of tensile armor layers wound with a long pitch, and an external protective sealing sheath made of a polymer, characterized in that the profiled wire constituting the vault has an I-shaped cross section.

I-shaped (or H-shaped) sections have already been proposed within the specific framework of flexodrilling, for example in documents FR 2 210 267 A or FR 2 229 913 A. However, these sections are used to produce the tensile armor layers, that is to say they are in the form of windings of non-interlockable wires with a long pitch, whereas the pressure vault is always produced with S- or Z-shaped interlockable profiled wires. Moreover, in this flexodrilling application, the proposed wires have a height/width ratio greater than 1 and a moment of inertia $I_{xx}$/moment of inertia $I_{yy}$ ratio of preferably between 1.5 and 2. Such a wire would neither allow the necessary bending nor the stability during winding with a short pitch (warping phenomenon).

Also known, from document GB 1 081 339 A, is a hose formed from a short-pitch winding of a box strip having an I-shaped cross section, the flanges of the I being flexible enough to be able, by deformation, to be imbricated one with respect to another. The hose in question has nothing to do with the pipes of the invention since it does not have either a pressure vault or any tensile armor layers, and is not intended for the same application. The winding does not in itself present any difficulty because it is a strip which, even boxed, remains very flexible. Besides, the height-to-width ratio of the I formed by the strip is very low (typically less than ⅓), which allows it to be easily wound.

The present invention differs from this in that it is a true profiled wire, that is to say a wire of relatively large cross section (with a mean diameter generally greater than 10 mm), which cannot be likened to a simple strip. In addition, according to the invention, the ratio of the height to the width of the I is preferably between 0.5 and 1 and even between 0.7 and 0.8.

Advantageously, the wire forms an I with thick flanges in which recesses are formed, these being intended to at least partially house fasteners, for example the flanges of U-shaped fasteners.

These recesses may be formed on the inside of the flanges, but are preferably formed on the outside of the flanges, in order to facilitate the fastening. They may be formed toward the ends of the flanges or indeed formed at the center of the flanges.

The invention will be clearly understood with the aid of the description which follows, with reference to the appended schematic drawings showing, by way of example, embodiments of the flexible pipe according to the invention. Further advantages and features will become apparent on reading the description.

BRIEF DESCRIPTION OF THE DRAWINGS

FIG. 1 is a schematic perspective view showing the successive layers of a pipe (in the present case, of the smooth-bore type) to which the invention applies.

FIG. 2 is a partial view in longitudinal section of a first embodiment of a flexible pipe according to the invention, the metal vault being formed from an I-shaped metal wire wound as a helix and fastened from above.

FIG. 3 is a partial view in longitudinal cross section of a second embodiment of a metal vault according to the invention.

FIGS. 4 to 16 show, in schematic partial cross section, five alternative forms of the I-shaped section for a profiled wire according to the invention, these being combined, where appropriate, with various fastening means.

DESCRIPTION OF PREFERRED EMBODIMENTS

Figure 4:
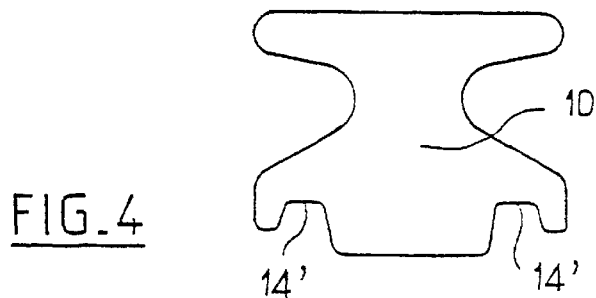

It should be noted that in some of the figures the spaces between the constituent elements have sometimes been intentionally exaggerated in order to make the drawings clearer.

As FIG. 1 shows, and in general, a pipe of the smooth-bore type comprises, from the inside outward, a polymeric internal sealing sheath 1, a metal vault 2 consisting of the winding of at least one profiled metal wire wound in a helix with a short pitch, an armor layer 30 resistant to the axial tension in the longitudinal direction of the pipe and usually consisting of one or more pairs of crossed plies 31, 32 of a winding with a long pitch in opposite directions, and a polymeric external sealing sheath 33. Other layers (not shown) may be provided, depending on the type and the application of the pipe, such as, for example, an internal carcass underneath the internal sealing sheath 1 (for so-called rough-bore pipes which are the preferred type of application of the invention), a hoop reinforcement layer consisting of a winding of a rectangular wire with a short pitch, interposed between the pressure vault 2 and the first armor ply 31, and intermediate sheaths placed between various armor plies.

FIG. 2 shows, in longitudinal cross section, an example of a pressure vault 2 according to the invention, formed from a profiled wire 10 of large cross section and therefore of large moment of inertia, but lightened since it consists of a profiled wire having a cross section in the form of an upright I (or an H on its side), which has a web 3 and flanges 4, 5, 6 and 7, the web 3 being wound approximately radially over and around the internal sheath 1 in a helix with a short catch, the external flanges 4, 5 and the internal flanges 6, 7 of the consecutive turns facing each other and together forming an approximately confined volume 8 helically traversing the vault 2.

The shape of the flanges may be highly varied, as may be seen below, as long as the flanges 6, 7 on the internal side, or the flanges 4, 5 on the external side, allow the wire to be interlocked. This is achieved either by self-interlocking by virtue of a special section given to the profiled wire, or by an attached interlocking wire which it is generally preferred to place on the outer face of the vault (so-called fastening "from above") both for reasons of ease of manufacture and of better strength of the pipe, especially when it is used in dynamic mode (riser).

In the embodiment shown in FIG. 2, the I-shaped metal wire 10 of the pressure vault 2 of the flexible pipe is interlocked by a fastener 11 on the external face of the vault; the fastener 11 consists of a wire in the form of a flat U wound helically in recesses 14 of the external face of the vault 2, that is to say by the outer flanges 4 and 5 of the metal wire 10, and it joins together, at these outer flanges 4 and 5, the consecutive turns of the helically wound metal wire 10. The fastener 11 is advantageously placed slightly set back with respect to the volume envelope of the external face so as to prevent the armor layers from bearing on the fastener 11, which would run the risk of inducing fatigue in dynamic use.

To give a pipe flexibility, the metal wire 10 is wound helically by leaving internal and external helical gaps on the respectively internal and external faces of the pressure vault, these caps opening onto the internal volume 8. In order to prevent the possibility of the sheath 1 creeping between the flanges 6 and 7 of two consecutive turns, it is advantageous to provide an anti-creep device consisting of an overlay element 12 produced, in FIG. 2, by the overlap of the parts 20, 21 of the unsymmetrical flanges 6, 7 facing the internal sheath 1. These parts 20, 21 overlap longitudinally so that they allow the formation of the longitudinal gap 9 but, on the other hand, leave virtually no passage in the thickness direction of the flanges, so as to bar access between the sheath 1 and the confined volume 8.

FIG. 3 shows in greater detail a preferred embodiment of the I-shaped profiled wire fastened from above by means of a fastener 11 similar to that in the embodiment of FIG. 2 and intended for dynamic applications. The anti-creep overlay element 12 consists here of a flat wire, for example made of PTFE-coated metal, wound helically in the inner face of the vault 2, in the symmetrical inner flanges 6 and 7 of the metal wire 3, by means of facing recessed parts 13 made over the length of the flanges 6 and 7 of the consecutive turns of the metal wire 3 which are the furthest inside the pipe. These recessed parts 13 are substantially in shape correspondence with said overlay element 12 so that the latter 12 can be easily housed therein, at least partially.

The wire 10 is in the form of a I with a height H and a width L, its web 3 having a thickness l. The flanges have a height a and are joined to the web by a surface 15 approximately in the form of a dihedron with a rounded peak, the dihedron making an angle α with a plane parallel to the base of the flanges, this angle being determined by the rolling conditions for and the constraints on the I (the position of the center of gravity, distribution of the stresses, weight). These surfaces 15 are joined to the web by a rounded piece whose radius of curvature is defined by the rolling options. It has been discovered according to the invention that, in order to obtain the desired weight saving for the same moment of inertia, it is preferable to have:

(1) $I_{xx}/I_{yy}<1$ (xx and yy denoting the respective horizontal and vertical axes with respect to the I);

(2) $0.5<H/L<1$ and preferably, (2'), $0.7<H/L<0.8$;

(3) $0.2<l/L<0.6$ and preferably, (3'), $0.3<l/L<0.5$;

(4) $0<\alpha<45°$ and preferably, (4'), $10°<\alpha<30°$.

With regard to the interlocking, this is achieved so as to allow the adjacent interlocked wires to be separated by a clearance of between a zero minimum clearance (see the two wires on the left in FIG. 3) and a maximum clearance (see the two wires on the right in FIG. 3), to which clearances a minimum pitch and a maximum pitch correspond, the half-sum of which pitches is the mean pitch $P_m$. The recesses 14, of width C, are limited by a rim of width J and of height M and are separated by a distance F. The recesses, which are here represented by right-angled walls, may be flared; in this case, the profile of the fastener is modified accordingly. The U-shaped fasteners 11 have a thickness e and a width D and their feet 17 have a height G and a width U. The back of the fasteners 11 is set in by a small distance b with respect to the level of the I-shaped section. Preferably:

(5) G and $M>0.5$ mm and preferably G and $M>1$ mm, with $G<M$;

(6) $C>1$ mm and preferably 2 mm, with $C<U+10\%P_m$;

(7) $P_m<10L/9$;

(8) thickness $e>1$ mm, and preferably 2 mm;

(9) set-back b of about 0.1 mm;

(10) $D+F<L$;

(11) $I-2J<10\%P_m$.

Figure 17:
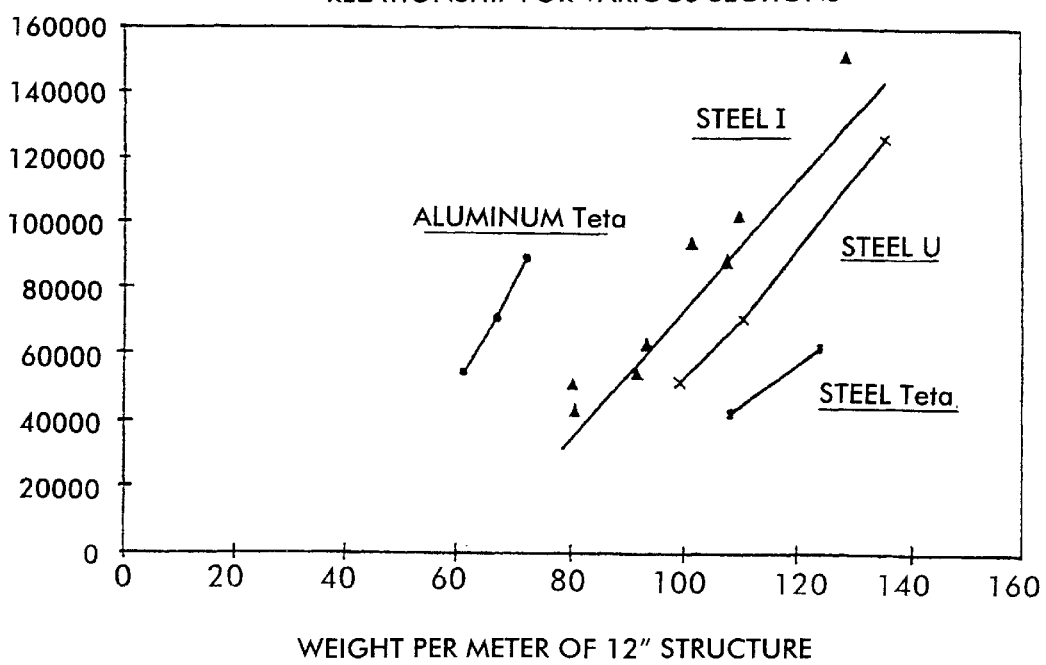
FIG. 17 is a graph showing, for various types of profiled wire, the relationship between the moment of inertia× modulus and the weight per meter of pipe.

To be more specific, the characteristic dimensions of the preferred embodiment in FIG. 3 are the following: $H=22$ mm; $L=28.6$ mm; $H/L=0.77$; $l=12$ mm; maximum pitch=33 mm; mean pitch=30.8 mm; $e=G=2$ mm; $D=13.3$ mm; depth of the recesses $14=4.2$ mm. For the same moment of inertia, it may be shown that this I-shaped cross section allows a weight saving of 25% over a conventional teta-shaped cross section. This is illustrated in FIG. 17 in which the relationship between the moment of inertia×modulus as a function of the weight per meter of the structure (for a 12", i.e. approximately 30 cm, pipe) has been compared for various profiled wire sections, namely conventional steel and aluminum teta-shaped and steel U-shaped sections and steel I-shaped sections according to the invention. It may be seen that, apart from the aluminum teta, which is necessarily lighter, the steel I according to the invention favorably decreases he weight/moment of inertia ratio compared with the teta-shaped and even the U-shaped wire.

Although the "cactus-shaped" section in FIG. 3 represents a preferred embodiment of the invention, many other forms are possible, including some of those illustrated in FIGS. 4 to 16.

Figure 5:
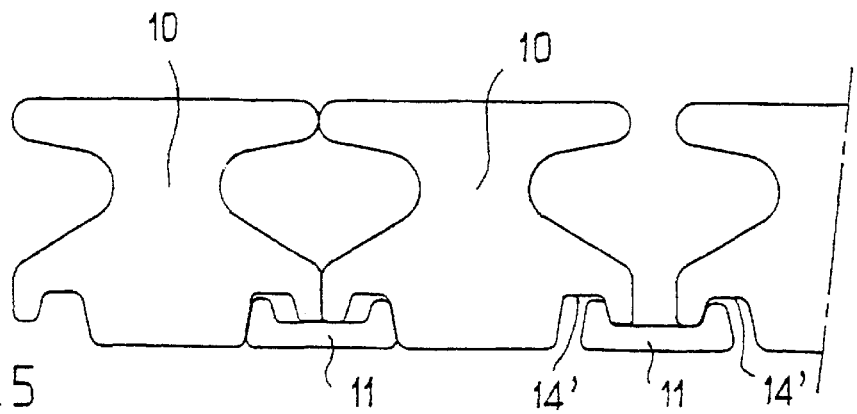

In FIGS. 4 and 5, the I-shaped section 10 has, at its base, recesses 14' intended for interlocking from the bottom by means of a U-shaped fastener 11 similar to that described in the previous embodiment. This method of interlocking from below is, in principle, reserved for use of the pipe in static mode.

FIGS. 6 to 9 illustrate possible sections for the wire 10, the arrangements corresponding to the method of interlocking adopted not having been shown in some of these figures.

In FIG. 6, the width of the upper flanges 4 and 5 of the symmetrical section has been reduced. This section is advantageously interlocked on the inside, as shown in FIG. 13, by U-shaped fasteners 11 placed in housings 14" formed on the upper part of the lower flanges 6, 7 and an element, such as a seal, may be placed on top of the fastener 11.

FIG. 7 shows a section similar to a basic I, the upper flanges 4, 5 of which have been modified so as to include self-interlocking hooks 18.

FIG. 8 shows a section 10 with unsymmetrical flanges 4, 5 and 6, 7, allowing self-interlocking from above and from below, the latter solution being illustrated in FIG. 14, which shows self-interlocking hooks 18 formed in a complementary manner on the flanges 6, 7.

FIG. 9 shows a I-shaped section 10 with a very high moment of inertia by virtue of the large thickness of the flanges 4 to 7, which terminate in a rim 19. The rim 19 may serve for the interlocking, unless an interlocking method like that in FIGS. 15 or 16 (described later) is chosen.

Previously, interlocking via the flanges, either on the top side or on the bottom side, where the flanges of the U-shaped fasteners 11 are housed in recesses 14 placed entirely in the flanges of the I-shaped section, was described. This allows the fastener 11 to be completely retracted but it requires making the flanges which receive the recesses 14 sufficiently thick.

Provision may also be made for the recesses 14 for housing he fasteners to be closer to the mid-plane of the section 10, or even at the point of forming only a single central groove housing the flanges of the two adjacent U-shaped fasteners 11, as shown in FIG. 10 (interlocking from above) and FIG. 11 (interlocking from below). In this case, the fasteners 11 are no longer retracted.

Up until now U-shaped fasteners have been described, but it goes without saying that other fastener sections may be adopted, for example a zeta section like that illustrated in FIG. 12 which shows a zeta fastener 11''', the edges of which are housed in recesses 14''' provided on the respective lower and upper faces of the flanges 6 and 7 (interlocking from below).

FIG. 15 shows an embodiment of interlocking by straddling, which does not require a recess for housing the flanges of the fasteners; in this case, the fasteners 11' in the form of a wide U straddle two I-shaped sections 10, the upper fasteners being offset with respect to the lower fasteners so that the combination of the two fastener wires allows the sections 10 to be effectively held together between their flanges.

In FIG. 16, the straddling fasteners 11' are similar to those in the previous figure, except that they are housed in central grooves 14, alternatively at the top and at the bottom, of the sections 10 which are similar to those in FIGS. 10 and 11.

What is claimed is:

1. A flexible tubular pipe with an inside and an outside, the pipe comprising from the inside outward:

an internal sealing sheath; and a cylindrical pressure vault outside the internal sheath, the pressure vault having an external face and having an internal face placed over the internal sheath;

the vault comprising interlocked profiled metal wire wound in a helix with tunis at a relatively short pitch;

wherein the profiled wire defining the vault has an I-shaped cross-section including a central web of a reduced thickness of a dimension 1 in the longitudinal direction, internal flanges toward the internal face of the vault and respectively directed upstream and downstream from the central web along the length of the pipe, and external flanges toward the external face of the vault and also respectively directed upstream and downstream from the central web, the internal and the external flanges of adjacent turns of the helically wound vault wire face each other;

at least one of the internal flanges together and the external flanges together have a width L along the length of the pipe, wherein $0.2<l/L<0.6$.

2. The pipe of claim 1, wherein the width of both of the external and the internal flanges along the length of the pipe are equal at L.

3. The pipe of claim 1, wherein the widths of the wire along the length of the pipe at the external flanges and at the internal flanges are different from each other.

4. The pipe of claim 1, wherein the vault wire has a radial height H and the ratio of the radial height to the width L of the wire is less than 1.

5. The pipe of claim 1, wherein the vault wire has a radial height H and the ratio of the radial height to the width L of the wire is less than 0.8.

6. The pipe of claim 1, wherein the vault wire has a radial height H and the ratio of the radial height to the width L of the wire is greater than 0.5.

7. The pipe of claim 1, wherein the vault wire has a radial height H and the ratio of the radial height to the width L of the wire is greater than 0.7.

8. The pipe of claim 4, wherein the vault wire has a moment of inertia $I_{XX}$ in the width direction of the wire and has a moment of inertia $I_{YY}$ in the vertical radial direction and the ratio of the moment of inertia $I_{XX}$ to the moment of inertia $I_{YY}$ of the wire is less than 1.

9. The pipe of claim 1, wherein the vault wire has a moment of inertia $I_{XX}$ in the width direction of the wire and has a moment of inertia $I_{YY}$ in the vertical radial direction and the ratio of the moment of inertia $I_{XX}$ to the moment of inertia $I_{YY}$ of the wire is less than 1.

10. The pipe of claim 1, further comprising interlocking elements for interlocking adjacent helical turns of the wire.

11. The pipe of claim 10, further comprising the interlocking elements being at the turns of the wire and radially outward of the internal face of the vault.

12. The pipe of claim 10, wherein at least one of the external and the internal flanges includes recesses therein adapted for receiving the interlocking elements.

13. The pipe of claim 12, wherein the recesses in the internal and external flanges are respectively formed on the internal face and external face of the vault.

14. The pipe of claim 13, wherein the interlocking elements extend into the recesses for fastening adjacent turns of the wire.

15. The pipe of claim 13, wherein each of the recesses which receives an interlocking element is of sufficient width as to at least partially house two of the fasteners, each extending in a different direction along the pipe.

16. The pipe of claim 1, further comprising a recess in at least one of the internal and the external flanges.

17. The pipe of claim 16, further comprising at least one ply of tensile armor layers wound around the vault and having a longer pitch than the vault; and an external protective sealing sheath around the at least one ply of tensile armor layers.

* * * * *

UNITED STATES PATENT AND TRADEMARK OFFICE
CERTIFICATE OF CORRECTION

PATENT NO.    : 6,253,793 B1  
DATED         : July 3, 2001  
INVENTOR(S)   : Francois Dupoiron et al.

It is certified that error appears in the above-identified patent and that said Letters Patent is hereby corrected as shown below:

<u>Title page,</u>
The Assignee should read as follows:
-- [73] Assignee: COFLEXIP (FR) --

Signed and Sealed this

Twenty-eighth Day of May, 2002

Attest:

*Attesting Officer*

JAMES E. ROGAN
*Director of the United States Patent and Trademark Office*